Feb. 20, 1951 L. M. PEUROZET 2,542,834

VISUAL FIGURE CHECKING DEVICE

Filed Feb. 12, 1948

Inventor:

Leon Marcel Peurozet

By Marcel [illegible]

Patented Feb. 20, 1951 2,542,834

UNITED STATES PATENT OFFICE 2,542,834

VISUAL FIGURE CHECKING DEVICE

Léon Marcel Peurozet, Asnieres, France

Application February 12, 1948, Serial No. 7,917
In France July 12, 1946

Section 1, Public Law 690, August 8, 1946
Patent expires July 12, 1966

3 Claims. (Cl. 235—89)

This invention relates to visual checking devices for the use of accountants, bookkeepers, bank clerks, secretaries and others who must deal with figures in written or typed form, and particularly to a visual figure-checking device.

The main object of my invention is to provide convenient means for visually checking errors among written figures, especially totals, in such fashion that the error involved will stand out and be unfailingly detected because it becomes so obvious.

An ancillary object of this invention is to have a practical and simple device by which it is easily possible to quickly locate erroneous reversals or inversions of digits, figures and numbers, so that no appreciable time will be lost in hunting for elusive mistakes of this nature, with the result that errors will be discovered in one-tenth of the time frequently required to detect them in conventional manner.

Other objects and the advantages of the invention will appear more fully as the specification proceeds.

In banking or commercial bookkeeping operations, it happens frequently, when writing numbers in a ledger, for example, a transposition of a number when a clerk may write one number when he should have written a different one, for instance, when one number has been written 431 when it should have been 413. In this case, the addition of the sums or numbers contain the sum or number reversed or inverted in this manner, causes the error to appear in the resulting total, by comparison with the reference total when this latter is otherwise available, in the form of a positive or negative difference when this total is available from some other source, with the error appearing as a number having one or two significant figures followed by zeros and adding up to 9.

Assuming, on the other hand that when, in an addition, a positive or negative error exists as a number having one or two significant figures adding up to 9, an error has occurred during the carrying forward such as a possible inversion of two consecutive figures, or a more rare offset of the numerical order in a number ending in one or more zeros (for example 700 carried forward as 70 or, inversely, 70 carried forward as 700).

The search for an error such as this necessitates successive checking of all numbers or sums involved in the constitution of the wrong total, this meaning, in most cases, an excessively long and tedious operation.

This invention is designed to solve such problems expeditiously, and consists essentially of a flat envelope constituting a sheath in which a sliding slide is adapted to sheath longitudinally, the said slide bearing on one of its faces two series of digits from 0 to 8 and provided on this same surface, with apertures in which are exposed two series of digits from 1 to 9 borne by the slide, and one opening in which are successively exposed during movement of the slide, one of the numbers from 9 to 81 also appearing on the latter and the sum of the figures add up to 9 and include the significant figures of the addition errors likely caused by reversal or inversion of two consecutive figures. The assembly of figures and apertures is so arranged that when one of the above mentioned figures from 9 to 81 appears in the last mentioned aperture, the visible figures on the slide form with those on the sheath both figure groups whose inversion is the likely cause of the corresponding adding error. It will obviously then be easy to identify, in the account, invoice or the like containing the error, the numbers comprising one of these groups of figures, taking into account the proper place for these figures, with respect to the degree of importance of the noticed error.

One practical embodiment of the device, made according to the invention, is illustrated in the appended drawings, as a non limitative example.

Hence, in the practice of my invention, the device primarily comprises a slide member, sheath or envelope *a* having the form of a flat rectangular sheath, closed at one end and open at the other, and into which a flat slide *b* extends slidably. The slide member or sheath *a* and the slide *b* can be made of cardboard, plastic material, Celluloid, metal, wood, or any other suitable material. In order to facilitate the handling of the slide *b*, a thumb index such as *c* can be provided on each free edge of the open end of the sheath *a*.

On the front face of the sheath *a* are printed, engraved or applied in any other manner two series of digits from 0 to 8, arranged in two vertical columns and in increasing numerical order from the top to the bottom adjacent to these two columns of digits, two vertical apertures $d1$ and $d2$ are cut out from the same front face of the sheath, and, preferably along the longitudinal axis of the sheath, a small rectangular opening $e$ is also provided.

Figures 1, 3:
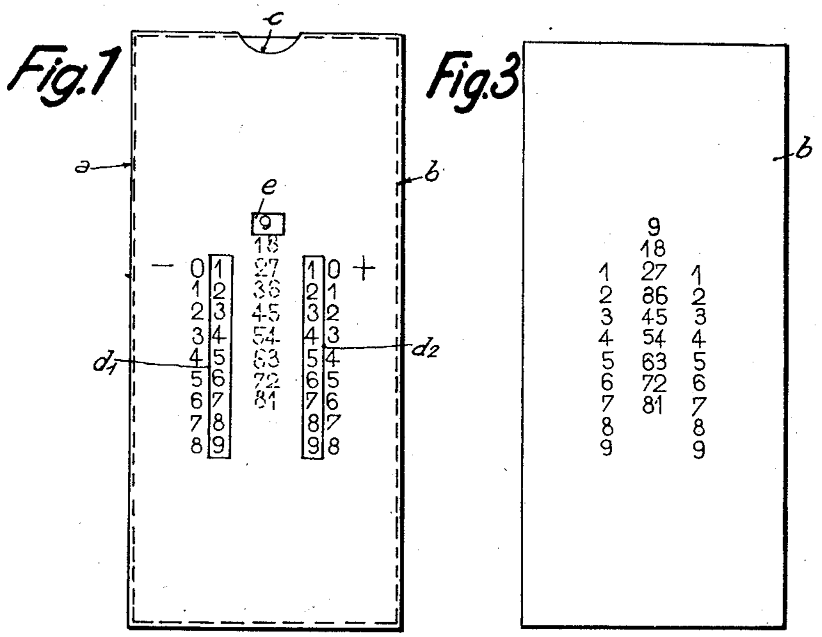
Fig. 1 is a front elevation of the whole device.
Fig. 3 is a front elevation of the slide entirely slid out of the sheath.
Figure 2:
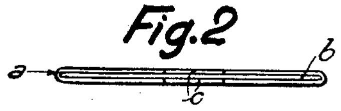
Fig. 2 is an end elevation corresponding to Figure 1.
Figure 5:
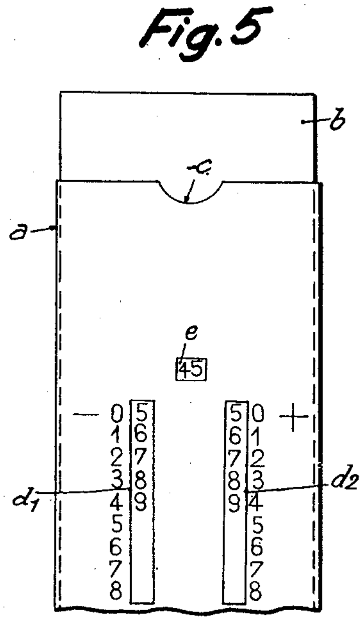
Figs. 4 and 5 are front elevations similar to Fig. 1, showing the device in two different operating positions.

Slide $b$ is likewise provided on its front surface with two series of digits from 1 to 9 arranged as those already mentioned, in two vertical columns and increasing in numerical order downwards, the respective location and height of these columns being such that when the slide is slid entirely into the sheath $a$, as illustrated in Fig. 1, they are all visible in the apertures $d1$ and $d2$ of the slide, each of the digits constituting these columns being juxtaposed to one of the digits of the columns appearing on the sleeve. Along the longitudinal axis of the slide $b$ is traced a column of figures comprising the numbers from 9 to 81 in which the sum of the digits is equal to 9. The numbers forming this column are spaced vertically apart by intervals equal to those spacing the digits apart in each of the columns of figures already described, and the number 9 placed at the top of said column is located at a level effective to display it in the small intermediate aperture $e$ of the sheath $a$ when slide $b$ is completely slid into the latter.

Signs + and − can be inscribed respectively adjacent to each of the columns of the sheath $a$.

In the example given where the apertures $d1$ and $d2$ are located between the columns and the longitudinal axis of the sheath, the sign + is placed adjacent to the right hand column and the sign − adjacent to the left hand column. The arrangement would be reversed if the apertures $d1$ and $d2$ were located between the columns of digits and the outer edges of the sheath.

The device constructed in this manner is used as follows:

If the noticed error in an addition is equal to $9\times10n$, the sheath is used in the position shown in Fig. 1, with the slide entirely slid in, the number 9 appearing then in the aperture $e$. The two groups of two digits formed on the one hand by the column of digits located on the left hand side of the sheath $a$ and by the column of digits appearing in the adjacent aperture $d1$ and, on the other hand, by the column of digits appearing in the aperture $d2$, representing the groups in one of which the inversion can have occured, which is the cause of the said error. If it is an error in excess, or a positive error, one of the digits of the right hand column has been marked instead of one of the left hand column. In case of a negative error, one of the digits in the left hand column has been marked instead of the corresponding one in the right hand column. It is only necessary to search among the numbers comprised in the wrong total, for a number similar to one of the two figure groups revealed. When the difference noticed is equal to $9\times10n$, the figures likely to have been inverted must be looked for in the columns according to the numerical order corresponding to the order occupied by the Figure 9 in this difference and to the numerical order immediately above. For example, if a difference of 9000, is rated, the inversion has taken place between two figures respectively involving the tens and units of thousands.

Figure 4:
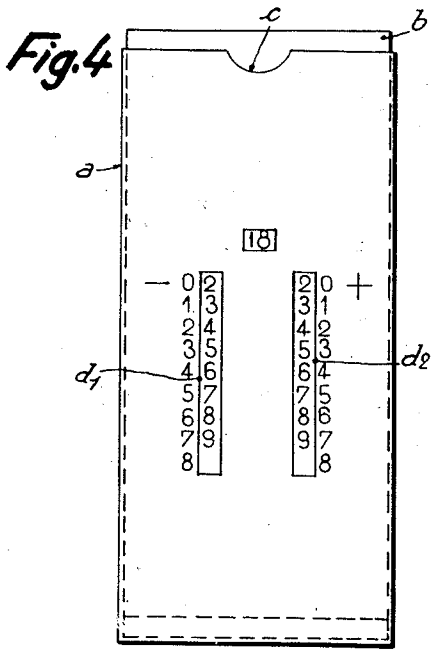

If the noted error is, for instance, equal to $18\times10n$, the slide $b$ is slid out until the number 18 of its intermediate column appears in the aperture $e$ as shown in Figure 4. The columns of digits located to the right and to the left of the sheath $a$ and of the slide $b$ then form two new double digit groups among which those should be sought which are likely to have caused the erroneous inversion. These digits must then be sought in the columns corresponding respectively to the numerical orders occupied by the digits 1 and 8 in the noted error. For instance, a difference of 1800 is derived from an inversion between two digits, of which one belongs to the units of thousands and the other to the hundreds.

If the noticed error is equal to $45\times10n$, the slide $b$ is slid out until the number 45 appears in the aperture $e$ and the procedure is then the same as in the preceding example, but limiting the search for the error to the sole two digit groups resulting from this new position of the slide or sliding rule.

It is to be understood that the invention is not limited in its application to the example illustrated and described, but may be variously modified.

Especially, could the slide and the sheath be mounted with respect to each other as an associated set of slides similar to the construction used in a slide rule. The arrangement of the various columns of digits and figures and of the apertures could also be different without departing from the spirit and scope of the invention.

Having now fully described my invention, I claim:

1. A device for facilitating prompt detection of an accidental transposition of digits in columns of numbers to be added, including an elongated slide; a slidable member adapted to cooperate with the slide and having two elongated sight openings therein forming viewing windows spaced apart and extending longitudinally in parallelism to the direction of a longitudinal sliding movement of the slide with respect to the slidable member, said slide having three parallel columns of digits and figures disposed in such positions laterally that two of the three columns are simultaneously exposable through the two elongated sight openings, said slidable member having two columns of digits extending along the two elongated sight openings thereof; and a relatively short additional sight opening provided in said slidable member through which the figures of the third column of digits and figures on said slide are exposable one at a time, while a certain number of digits of the two other columns of digits on said slide are simultaneously visible through said two elongated sight openings in said slide member laterally of the digits of the two columns on the latter member along said two sight openings in such relative arrangement that the difference between the lateral composite numbers formed by the juxtaposition of the digits on the slide appearing through said two sight openings and the digits extending along said openings on said slide member are equal to the figure appearing through said short additional sight opening in said slide member.

2. A device for facilitating prompt detection of an accidental transposition of digits in columns of numbers to be added, including an elongated slide; a sheath open at one end for slidably receiving the slide longitudinally and having two elongated sight openings in one side thereof forming viewing windows spaced apart and extending longitudinally in parallelism to the direction of longitudinal sliding movement of the slide with respect to the sheath, the latter having two columns of digits juxtaposed symmetrically to the elongated sight openings and a third relatively short sight opening forming a third viewing window provided intermediate but beyond the end of said two elongated sight openings; two columns of digits arranged longitudinally on the slide in parallelism to the direction of sliding movement thereof in effective positions, when the slide is displaced to display said digits through the two elongated sight openings in said sheath and form with the digits of the two columns juxtaposed symmetrically to the latter openings two respectively transposed series of composite numbers; a third column of figures disposed on said slide intermediate and parallel to the two columns of digits thereon in effective position to be singly and successively explosable through said third short sight opening and in each case equal the difference between the symmetrically transposed composite numbers in terms of nine or a multiple thereof disposed laterally opposite in the columns of digits on the slide and sheath in correspondence to the relative longitudinal displacement of said slide in said sheath.

3. A device for facilitating prompt detection of an accidental transposition of digits in columns of numbers to be added, including an elongated slide; a sheath open at one end for slidably receiving the slide longitudinally and having two elongated sight openings in one side thereof forming viewing windows spaced apart and extending longitudinally in parallelism to the direction of longitudinal sliding movement of the slide with respect to the sheath, the latter having two columns of digits juxtaposed symmetrically to the elongated sight openings with one column indicated by a minus sign at one side and the other column indicated by a plus sign at the other side, and said sheath having a third relatively short sight opening forming a third viewing window provided intermediate but beyond the end of said two elongated sight openings; two columns of digits arranged longitudinally on the slide in parallelism to the direction of sliding movement thereof in effective positions, when the slide is displaced to display said digits through the two elongated sight openings in said sheath and form with the digits of the two columns juxtaposed symmetrically to the latter openings two respectively transposed series of composite numbers; a third column of figures disposed on said slide intermediate and parallel to the two columns of digits thereon in effective position to be singly and successively explosable through said third short sight opening and in each case equal the difference between the symmetrically transposed composite numbers in terms of nine or a multiple thereof disposed laterally opposite in the columns of digits on the slide and sheath in correspondence to the relative longitudinal displacement of said slide in said sheath.

LÉON MARCEL PEUROZET.

REFERENCES CITED

The following references are of record in the file of this patent:

UNITED STATES PATENTS

| Number | Name | Date |
|---|---|---|
| 565,797 | Roller | Aug. 11, 1896 |
| 778,790 | Merrill | Dec. 27, 1904 |
| 1,000,291 | Pettit | Aug. 8, 1911 |
| 1,641,982 | McDade | Sept. 13, 1927 |